United States Patent
Norimatsu

[19]

[11] Patent Number: 5,819,170
[45] Date of Patent: Oct. 6, 1998

[54] POWER SUPPLY UNIT WITH SWITCH-ON/OFF FACILITY FOR POWERING RADIO EQUIPMENT

[75] Inventor: Noriko Norimatsu, Tokyo, Japan

[73] Assignee: NEC Corporation, Tokyo, Japan

[21] Appl. No.: 846,034

[22] Filed: Apr. 25, 1997

Related U.S. Application Data

[63] Continuation of Ser. No. 447,824, May 23, 1995.

[30] Foreign Application Priority Data

May 24, 1994 [JP] Japan .................................... 6-108844

[51] Int. Cl.⁶ ..................................................... H04B 1/16
[52] U.S. Cl. .......................... 455/343; 455/572; 455/127; 455/8; 340/825.44; 340/825.69
[58] Field of Search ..................................... 455/8, 9, 343, 455/127, 90, 73, 550, 572, 575; 340/825.44, 825.69, 825.72, 309.15, 309.4, 636, 333, 393

[56] References Cited

U.S. PATENT DOCUMENTS 4,749,991 6/1988 Davis et al. ....................... 340/825.31
5,212,811 5/1993 Kuge et al. ................................ 455/73
5,212,836 5/1993 Matsushita .............................. 455/343
5,404,578 4/1995 Kuge et al. ................................ 455/73
5,555,167 9/1996 Fujihashi .................................. 363/49

FOREIGN PATENT DOCUMENTS 0 346 639  12/1989  European Pat. Off. .

Primary Examiner—Reinhard J. Eisenzopf
Assistant Examiner—Darnell R. Armstrong
Attorney, Agent, or Firm—Scully, Scott, Murphy & Presser

[57] ABSTRACT

A power supply unit with a switch on/off facility for powering radio equipment is disclosed. The power supply unit includes an input portion having keys, a power generating circuit for generating power, and a switch connected to the power generating circuit for turning on and off the power to the radio equipment. The power supply unit further includes a disabling portion for disabling the on/off switch in response to operation of a predetermined one of the input portion keys.

5 Claims, 7 Drawing Sheets

POWER SUPPLY UNIT WITH SWITCH-ON/OFF FACILITY FOR POWERING RADIO EQUIPMENT

This application is a continuation of application Ser. No. 08/447,824 filed May 23, 1995 which application is now pending.

BACKGROUND OF THE INVENTION

1. Field of the Invention

The present invention relates to a power supply unit, and more particularly to a power supply unit with a switch-on/off facility for powering radio equipment.

2. Description of the Related Art

In the case of radio equipment of the prior art, powering radio equipment is switched on or off by pressing the power supply key of the keypad component of the radio equipment. Pressing the power supply key to turn off the supply of power to radio equipment still being used for conversation naturally presents the inconvenience of breaking off the call.

As a solution to this problem, for example, Japanese Patent Application Laid-Open Heisei 2-155320 discloses radio telephone equipment which is designed not shut off from power service during conversation even if the power supply key is pressed. The radio telephone equipment includes a transceiver unit and a controller unit to be connected to the transceiver unit. The transceiver unit includes a power supply for generating a power voltage, a power supply switch to be connected to the power supply for supplying each circuit with the power voltage, a line status monitor for monitoring the line status of the radio telephone equipment and a power supply line control circuit for on/off control of the power supply switch. The control unit includes a power supply key and a power supply key input detection circuit to detect pressing of the power supply key.

With such radio telephone equipment, when the power supply key of the control unit is pressed while the power supply switch of the transceiver unit is on, the power supply key input detection circuit detects the pressing and outputs a detection signal to the power supply line control circuit of the transceiver unit. The line status monitor of the transceiver unit outputs a line busy signal to the power supply line control circuit while the call is still in progress on the radio telephone equipment. The power supply line control circuit does not turn off the power supply switch of the transceiver unit in cases where the detection signal and the line busy signal are input thereto. On the other hand, in cases where the line is not occupied, the power supply line control circuit turns off the power supply switch upon input of the detection signal and a line non-busy signal.

An mentioned above, since the power supply line does not turn off the power supply switch, during the conversation, even when the power supply key is pressed, the call cannot be interrupted against the intention of the users. Radio telephone equipment, however, is sometimes left in a bag, pocket or the like with the power supply switched on even without conversation, to be ready to receive calls. In the case where there is no conversation, the power service will be shut off if the power supply key is pressed even against the intention of the user. Accordingly, this presents the problem that the radio telephone equipment cannot receive incoming call signals expected by the user.

In addition, such radio telephone equipment is designed in such a manner that the power supply switch is turned on when the power supply key is pressed. This naturally raises the possibility of lowering the power supply battery saving efficiency due to an accidental continuous ON state of the power supply during non-use periods of the radio telephone equipment.

SUMMARY OF THE INVENTION

It is an object of the present invention to provide a power supply unit with a switch-on/off facility for powering radio equipment, which allows disabling of turn-off of the switch connected to a power generator circuit.

It is another object of the present invention to provide a power supply unit which allows disabling of turn-on of the switch connected to a power generator circuit.

In order to accomplish the aforementioned objects, the power supply unit of the present invention includes a key pad with a plurality of keys, a power generator circuit for generating power, and a switch, connected to the power generator circuit, for turning on and off power to the radio equipment. Furthermore, the power supply unit is equipped with a disabling circuit which disables the turn-on and turn-off of the switch in cases where a predetermined key of the key pad is operated.

Since this power supply unit is designed so that the turn-off of the switch is disabled through operation of the plurality of keys of the key pad, the switch cannot be turned off against the intention of the user and thus the radio equipment on standby cannot fail to receive incoming call signals. Also since this power supply unit is designed so that the turn-on of the switch is disabled through operation of the plurality of keys of the key pad, there is no risk of the power supply battery saving efficiency being imparted because of an accidental continuous ON state of the power supply during non-use of the radio equipment.

BRIEF DESCRIPTION OF THE DRAWINGS

These and other objects, features and advantages of the invention will become more fully apparent from the following detailed description taken in conjunction with the accompanying drawings, wherein.

DETAILED DESCRIPTION OF THE PREFERRED EMBODIMENTS

Figure 1:
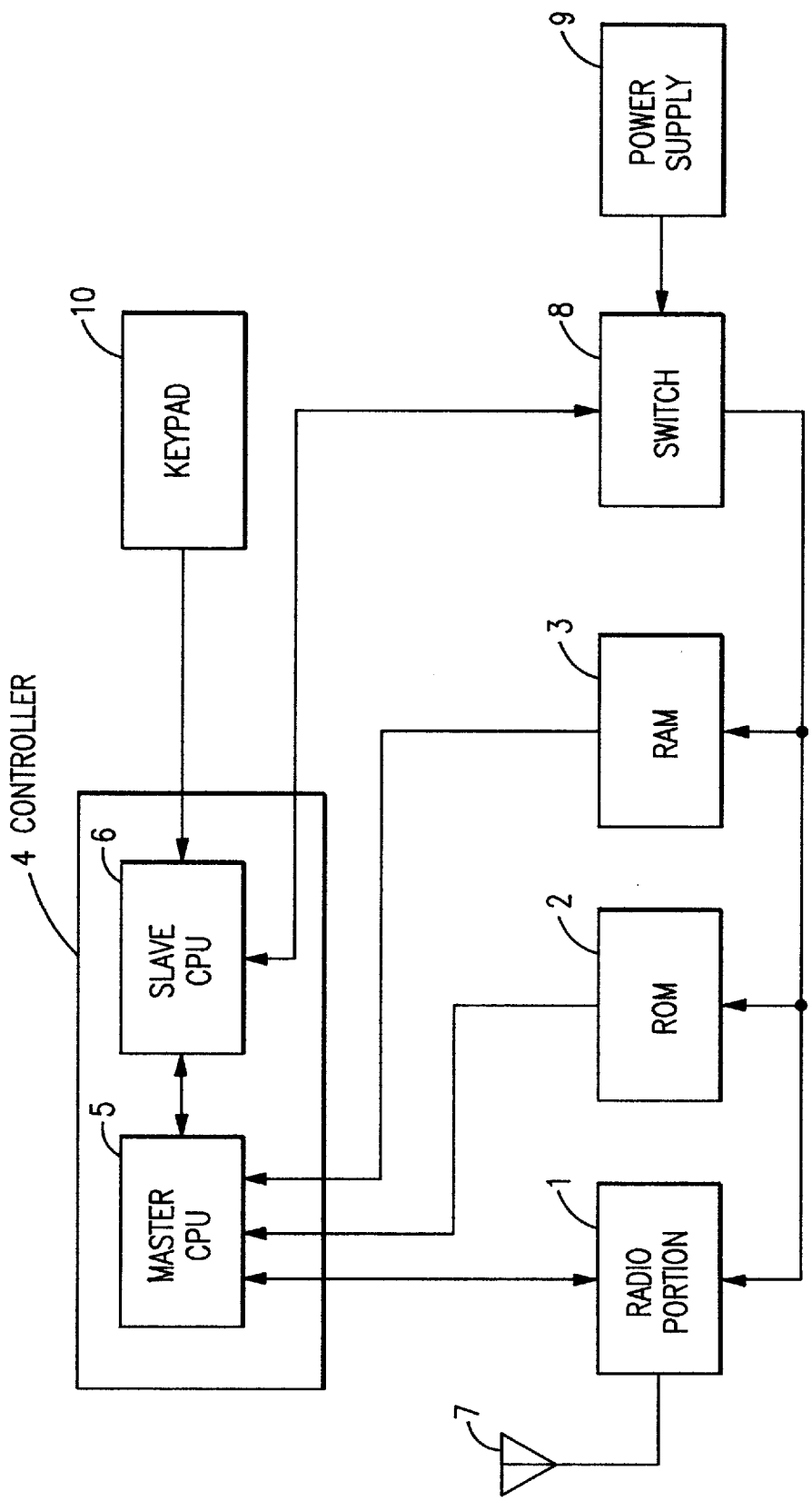
FIG. 1 is a block diagram of radio equipment according to a preferred embodiment of the present invention.

In FIG. 1, the radio equipment includes a radio portion 1, a read only memory (ROM) 2, a random access memory (RAM) 3, a controller 4, an antenna 7, a power supply switch 8, a power supply 9 and a keypad 10. The controller 4 has a master CPU 5 and a slave CPU 6.

The antenna 7 receives a radio signal from a counter part of a radio equipment (not shown), outputs the received signal to the radio portion 1, and further sends a modulated signal from the radio portion 1 to the counter part of the radio equipment. The radio portion 1 demodulates the received signal from the antenna 7, outputs a demodulated signal to the master CPU 5 in the controller 4, and further modulates a carrier with a digital signal from the master CPU 5 and outputs the modulated signal to the antenna 7. The master CPU 5 decodes the demodulated signal from the radio portion 1, generates the digital signal, and provides the digital signal to the radio portion 1.

The ROM 2 stores information necessary for executing a variety of functions of the master CPU 5. Based on the contents stored in the ROM 2, the master CPU 5 works to output a switch-on instruction signal and a switch-off instruction signal to the slave CPU 6 for turning on and off the switch 8. Based on a switch-off control signal from the slave CPU 6, the master CPU 5 executes writing and clearance of switch-off disabling mode in the RAM 3.

The slave CPU 6 has a built-in ROM which stores information necessary for execution of a variety of controls by the slave CPU 6. The slave CPU 6, in response to input of a power supply key-pressed signal from the keypad 10, detects whether the switch 8 has been turned on, and outputs a detection signal to the master CPU 5. The slave CPU 6 turns on and off the switch 8 based on the switch-on execution instruction signal and the switch-off execution instruction signal from the master CPU 5. The slave CPU 6 also outputs a switch-off control signal to the master CPU 5 when a switch-off control signal is inputted thereto from the keypad 10.

The master CPU 5 and the slave CPU 6 have, in addition to the aforementioned functions, a function of controlling the entire radio equipment, but explanation of this function was omitted since such type function is already known publicly and further has no direct connection with the present invention.

Most preferably the master CPU 5 is a microprocessor Z80, while the slave CPU 6 is μPD75008 manufactured by NEC.

The switch 8 is turned on and off by the slave CPU 6. The power supply 9 supplies a power voltage to the radio portion 1, the ROM 2 and the RAM 3 through the switch 8.

Figure 2:
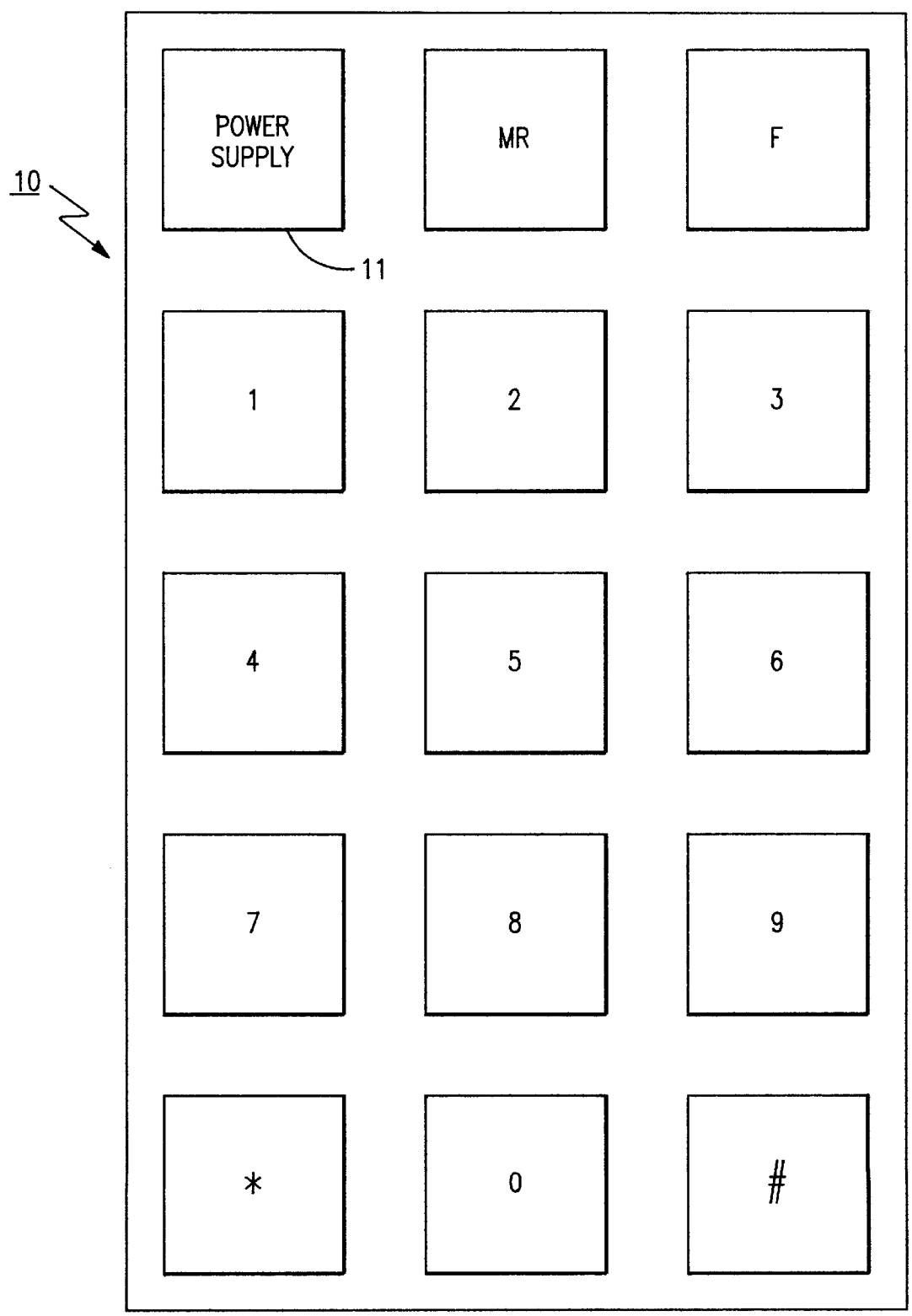
FIG. 2 is a front view of the keypad component shown in FIG. 1.

In FIG. 2, the keypad 10 shown in FIG. 1 has a set of operating keys which comprises ten keys 0–9, a memory key MR, a function key F, control keys # and * and a power supply key 11. When a predetermined key of the plurality of operating keys is operated, the keypad 10 outputs a switch-off control signal to the slave CPU 6. When the power supply key 11 is pressed, the keypad 10 outputs a power supply key-pressed signal to the slave CPU 6.

Figure 3:
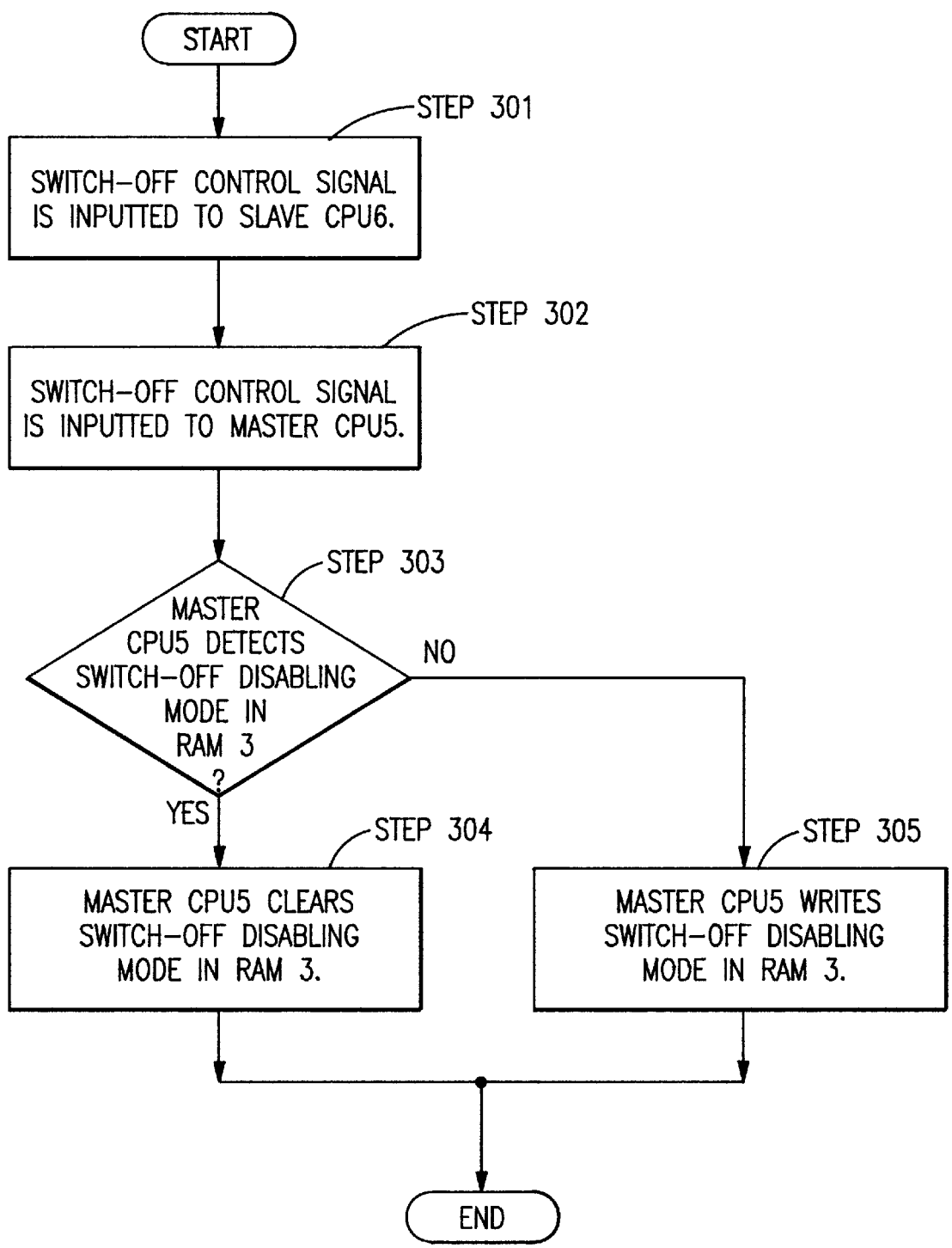
FIG. 3 is a flow chart illustrative of a method of setting switch-off disabling mode by the controller shown in FIG. 1.

In FIG. 3, when the memory key MR and the function key F of the keypad 10 are pressed in succession, the keypad 10 outputs a switch-off control signal to the slave CPU 6 (STEP 301).

Responding to this, the slave CPU 6 outputs a switch-off control signal to the master CPU 5 (STEP 302). With the switch-off control signal inputted, the master CPU 5 detects whether the switch-off disabling mode is stored in the RAM 3 (STEP 303).

Upon detection of the switch-off disabling mode in the RAM 3, the master CPU 5 clears the switch-off disabling mode in the RAM 3 (STEP 304). On the other hand, the master CPU 5 writes the switch-off disabling mode in the RAM 3 in cases where no switch-off disabling mode is detected in the RAM 3 (STEP 305).

As mentioned above, clearance and writing of the switch-off disabling mode in the RAM 3 may be executed by operation with the keypad component 10. Specifically, the switch 8 cannot be turned off even when the power supply key 11 is pressed while switch-off disabling mode is stored in the RAM 3.

Figure 4:
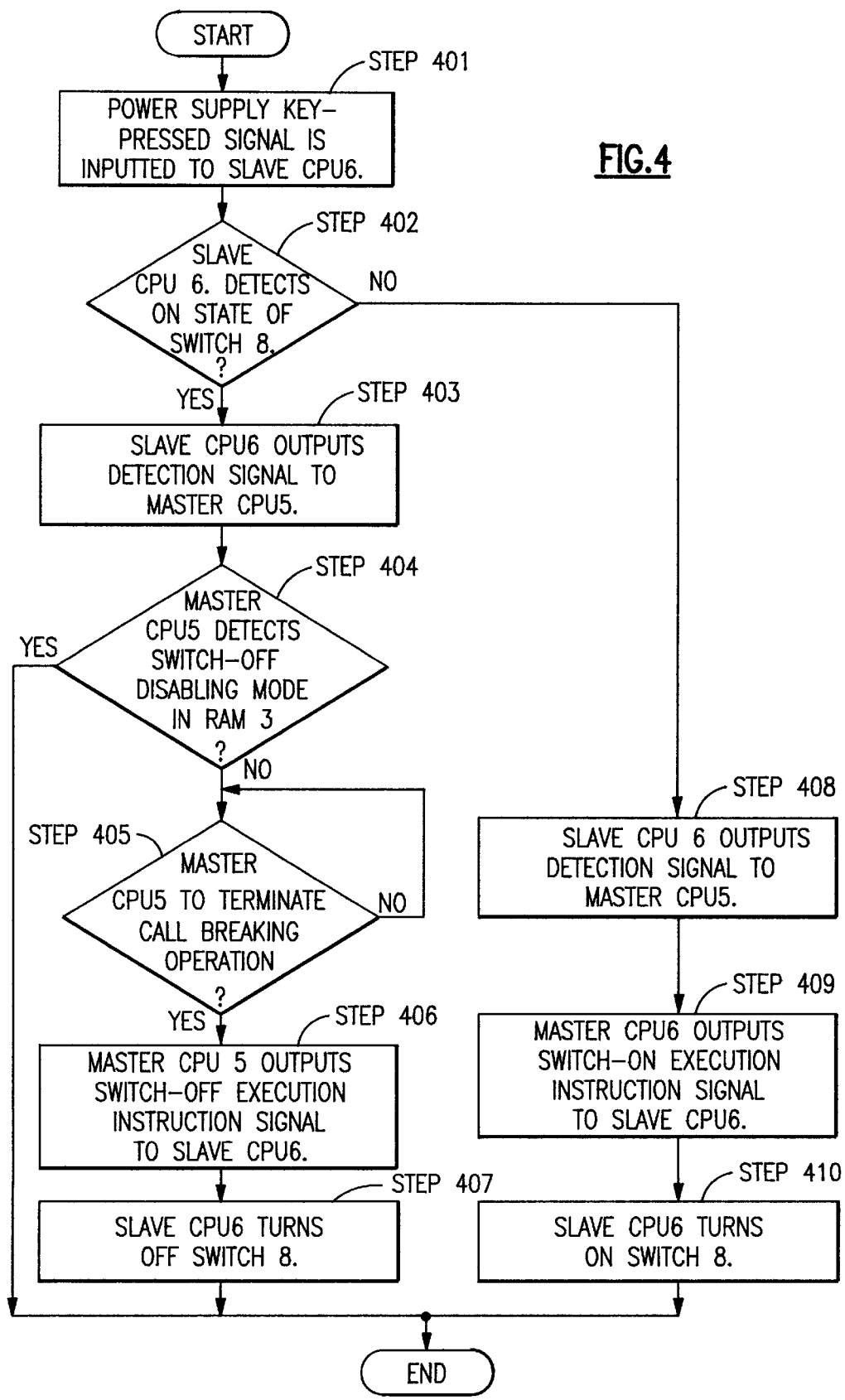
FIG. 4 is a flow chart illustrative of a method of turning off power supply to the radio equipment by the controller shown in FIG. 1.

In FIG. 4, when the power supply key 11 is pressed, the keypad 10 outputs a power supply key-pressed signal to the slave CPU 6 (STEP 401). In response to this signal, the slave CPU 6 detects whether the switch 8 has been turned on (STEP 402).

Upon detection that the switch 8 has been turned on, the slave CPU 6 outputs to the master CPU 5 a detection signal indicating that the switch 8 is on and the power supply key 11 has been pressed (STEP 403). The master CPU 5, with the detection signal from the slave CPU 6 inputted thereto, detects whether switch-off disabling mode is stored in the RAM 3 (STEP 404).

The master CPU 5 terminates its operation at the moment it detects the switch-off disabling mode in the RAM 3.

On the other hand, the master CPU 5 terminates call-breaking operation, as long as no switch-off disabling mode is detected in the RAM 3 (STEP 405). The master CPU 5, upon completion of terminating call breaking operation, outputs a switch-off execution instruction signal to the slave CPU 6 (STEP 406). The slave CPU 6 turns off the switch 8 in reply to the switch-off execution instruction signal from the master CPU 5 (STEP 407).

The slave CPU 6, upon detection by the process in STEP 402 that the switch 8 has been turned off, outputs to the master CPU 5 a detection signal indicating that the power supply key 11 has been pressed and that the switch 8 has been turned off (STEP 408).

The master CPU 5 outputs a switch-on execution instruction signal to the slave CPU 6 in response to the detection signal from the slave CPU 6 (STEP 409). The slave CPU 6 turns on the switch 8 in response to the switch-on execution instruction signal from the master CPU 5 (STEP 410).

As mentioned in detail above, the switch 8 cannot be turned off even when the power supply key 11 is pressed, as long as a switch-off disabling mode is stored in the RAM 3. As a result, the call is not interrupted against the intention of the user.

Figure 5:
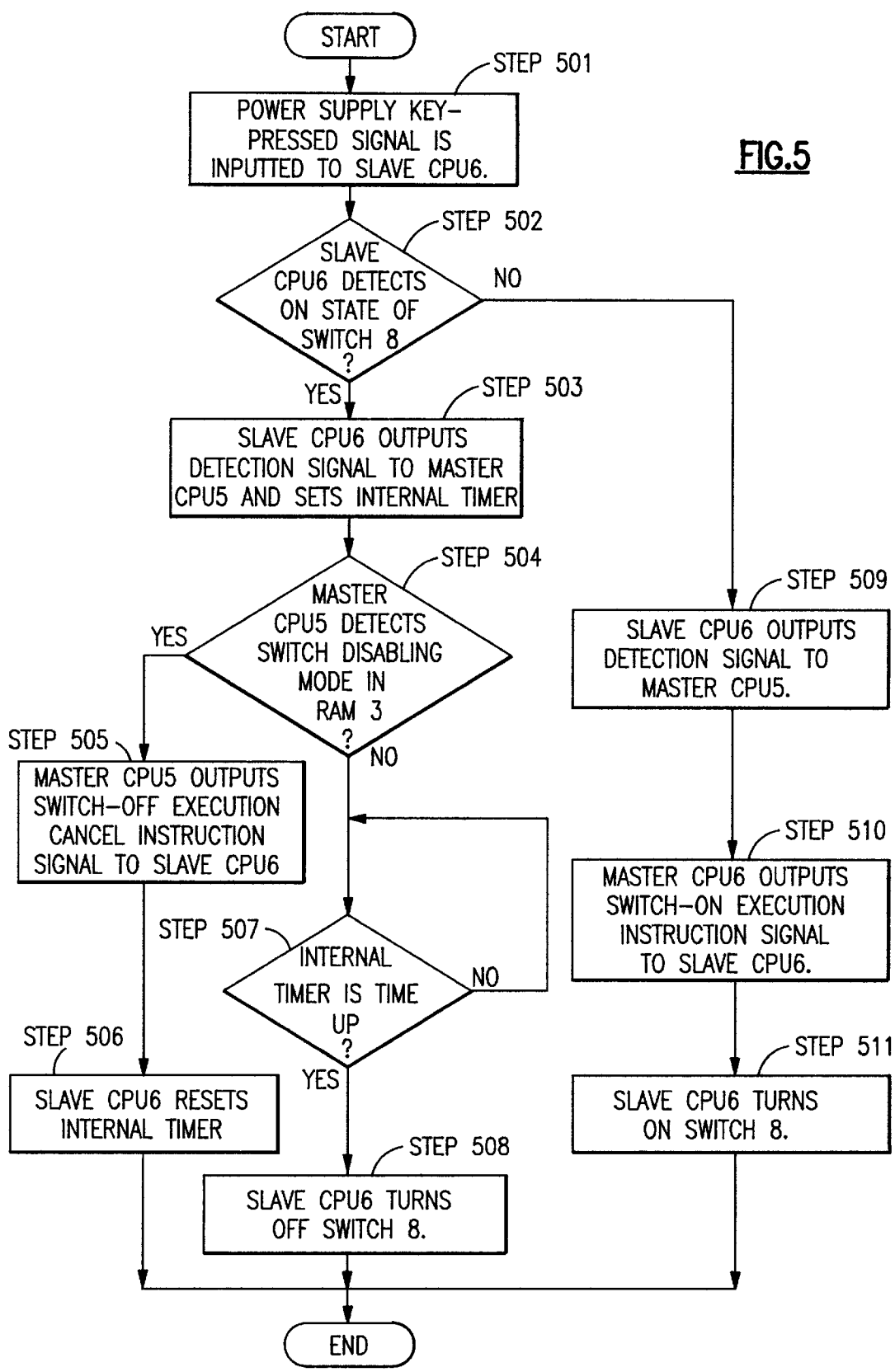
FIG. 5 is a flow chart illustrative of a method of turning off power supply to the radio equipment by the controller according to another embodiment of the present invention.

Another embodiment of the present invention will now be explained in detail with reference to FIG. 5. In FIG. 5, the slave CPU 6 clocks a certain time equal to that necessary for completion of terminating call breaking operation of the master CPU 5, and then turns off the switch 8.

At the moment the power supply key 11 is pressed, the keypad 10 outputs a power supply key-pressed signal to the slave CPU 6 (STEP 501). Responding to this, the slave CPU 6 detects whether the switch 8 has been turned on (STEP 502).

Upon detection of the turn-on of the switch 8, the slave CPU 6 outputs a detection signal which indicates that the turn-on of the switch 8 and the power supply key 11 have been pressed, and sets an internal timer as well (STEP 503). In reply to the detection signal from the slave CPU 6, the master CPU 5 detects whether switch disabling mode is stored in the RAM 3 (STEP 504).

The master CPU 5, upon detection of the switch-off disabling mode in the RAM 3, outputs a switch-off execution cancel instruction signal to the slave CPU 6 (STEP 505). In reply to the switch-off execution cancel instruction signal from the master CPU 5, the slave CPU 6 resets the internal timer (STEP 506).

Meanwhile, since the master CPU 5 does not output a switch-off execution cancel instruction signal unless it detects the switch-off disabling mode in the RAM 3, the slave CPU 6 waits for a time up of the internal timer (STEP 507), and turns off the switch 8 at the time of the time up of the internal timer (STEP 508).

When the turn-off of the switch 8 is detected by the process in STEP 502, the slave CPU 6 outputs a detection signal which indicates that the turn-off of the switch 8 and the power supply key 11 have been pressed, to the master CPU 5 (STEP 509). The master CPU 5, in reply to the detection signal from the slave CPU 6, outputs a switch-on execution instruction signal to the slave CPU 6 (STEP 510). In reply to the switch-on execution instruction signal from the master CPU 5, the slave CPU 6 turns on the switch 8 (STEP 511).

As mentioned in detail above, in FIG. 5, the slave CPU 6, instead of turning off the switch 8 in response to the switch-off execution instruction signal from the master CPU 5, may detect the turn-on of the switch 8 and turn off the switch 8 at the time of the time up of the internal timer.

Figure 6:
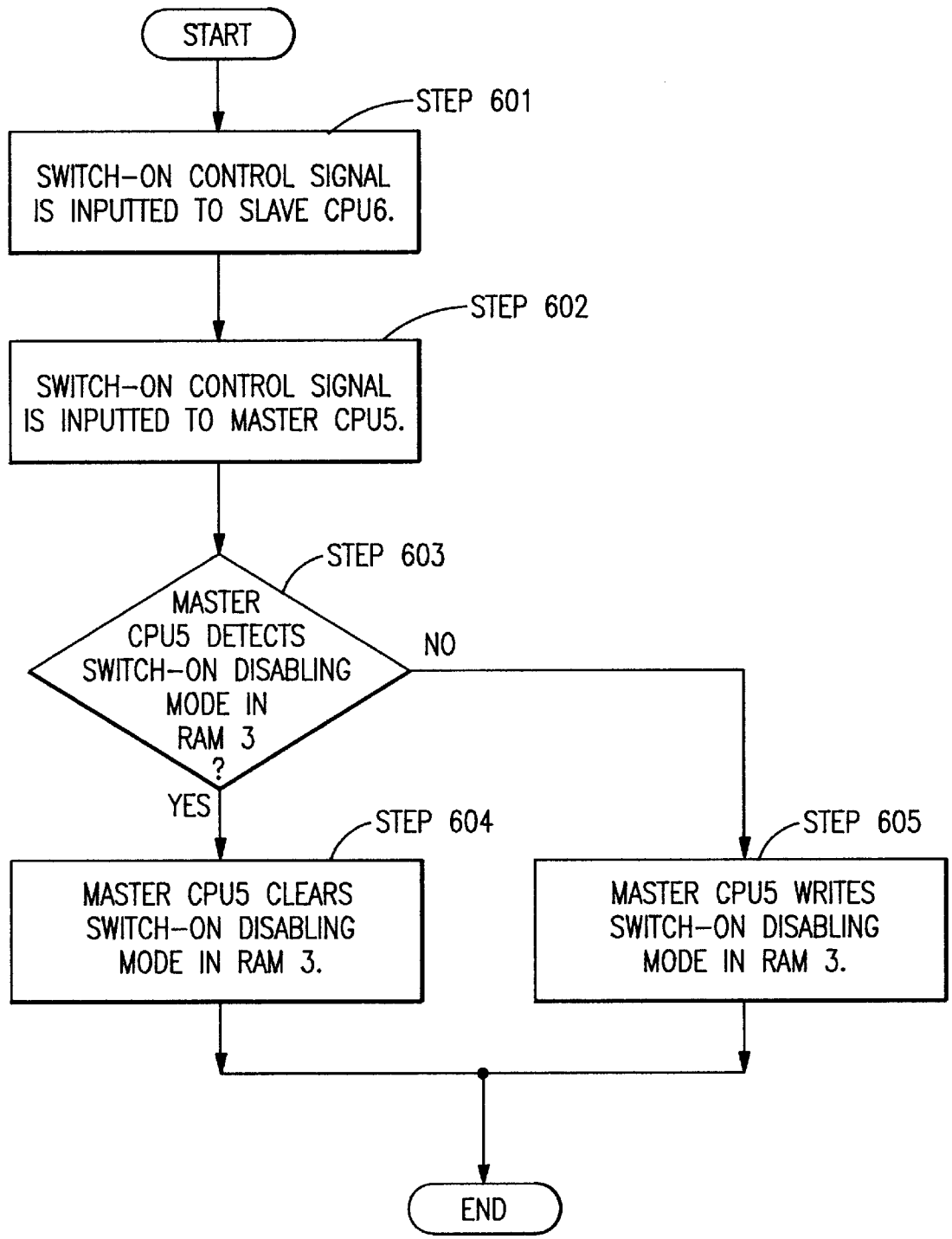
FIG. 6 is a flow chart illustrative of a method of setting switch-off disabling mode by the controller according to a still another embodiment of the present invention.
Figure 7:
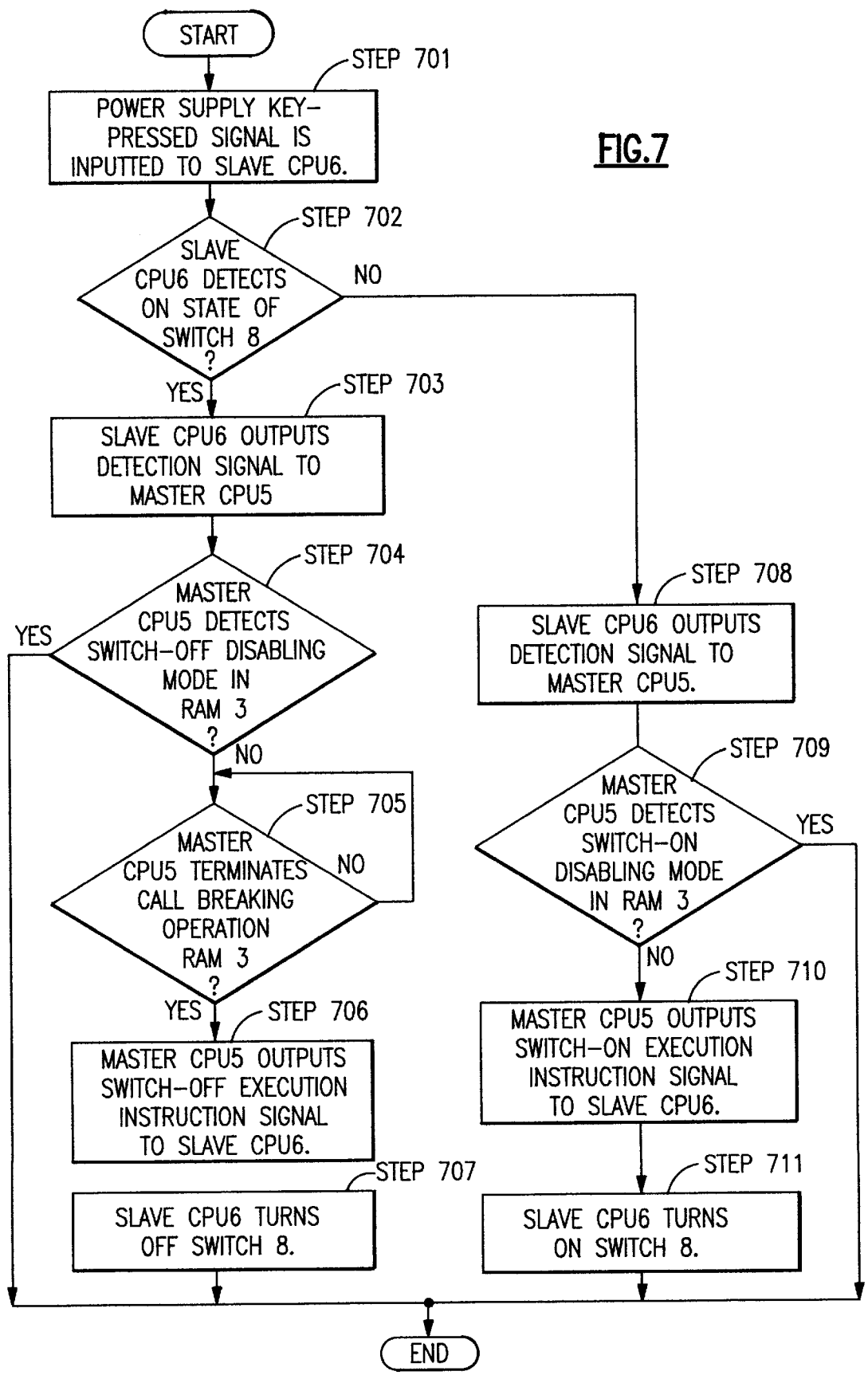
FIG. 7 is a flow chart illustrative of a method of turning on and off power supply to the radio equipment by the controller according to a still another embodiment of the present invention.

As still further embodiment of the present invention will now be explained in detail with reference to FIG. 6 and FIG. 7. In FIG. 6 and FIG. 7, operation of the keypad 10 allows setting of a switch-on disabling mode.

In FIG. 6, once a predetermined key of the keypad 10 is pressed, the keypad 10 outputs a switch-on control signal to the slave CPU 6 (STEP 601).

The slave CPU 6 outputs a switch-on control signal to the master CPU 5 (STEP 602). Responding to this, the master CPU 5 detects whether switch-on disabling mode is stored in RAM 3 (STEP 603).

Upon detection of the switch-on disabling mode in the RAM 3, the master CPU 5 clears the switch-on disabling mode in the RAM 3 (STEP 604). On the other hand, the master CPU 5 writes the switch-on disabling mode in the RAM 3 unless it detects the switch-on disabling mode in the RAM 3 (STEP 605).

In FIG. 7, the keypad 10 outputs a power supply key-pressed signal to the slave CPU 6 in cases where the power supply key 11 is pressed (STEP 701). Responding to this, the slave CPU 6 detects whether the switch 8 has been turned on (STEP 702).

Upon detecting that the switch 8 has been turned on, the slave CPU 6 outputs to the master CPU 5 a detection signal which indicates that the power supply key 11 has been pressed and the switch 8 has been turned on (STEP 703). The master CPU 5, with a detection signal inputted from the slave CPU 6 thereto, detects whether switch-off disabling mode is stored in the RAM 3 (STEP 704).

The master CPU 5 terminates its operation upon detection of the switch-off disabling mode in the RAM 3.

On the other hand, the master CPU 5 terminates a call breaking operation in cases where no switch-off disabling mode is detected in the RAM 3 (STEP 705). After completion of the call breaking operation, the master CPU 5 outputs a switch-off execution instruction signal to the slave CPU 6 (STEP 706). In reply to the switch-off execution instruction signal from the master CPU 5, the slave CPU 6 turns off the switch 8 (STEP 707).

In cases where turn-off of the switch 8 is detected by the process in STEP 702, the slave CPU 6 outputs to the master CPU 5 a detection signal which indicates that the power supply key 11 has been pressed (STEP 708). The master CPU 5, in response to the detection signal, detects whether switch-on disabling mode is stored in the RAM 3 (STEP 709). The master CPU 5 terminates its operation at the moment it detects the switch-on disabling mode in the RAM 3.

On the other hand, the master CPU 5 outputs a switch-on execution instruction signal to the slave CPU 6 unless the switch-on disabling mode is detected in the RAM 3 (STEP 710). The slave CPU 6 turns on the switch 8 in response to the switch-on execution instruction signal from the master CPU 5 (STEP 711).

As mentioned in detail above, in FIGS. 6 and 7, there is no risk of impairing the battery saving efficiency of the power supply 9 due to erroneous turn-on of the switch 8 against the intention of the user of the radio equipment, since the master CPU 5 sets a switch-on execution disabling mode upon operation of the keypad component 10.

Obviously, numerous additional modifications and variations of the present invention are possible in light of the above description. It is, therefore, to be understood that within the scope of the appended claims, the invention may be practiced otherwise than as specifically described herein.

What is claimed is:

1. A method of supplying power from a power unit for radio equipment, comprising the steps of:

detecting an operation of a predetermined key;

detecting a pressing of a power supply key;

detecting an ON state of a power supply;

disabling a turn-off of said power supply;

setting an adjustable timer to operate for an adjustable time after the power supply key is pressed; and turning off said power supply at the end of the adjustable time set by said adjustable timer.

2. A method of supplying power from a power supply unit for radio equipment, as claimed in claim 1, further comprising the steps of:

detecting the operation of said predetermined key again after said predetermined key is operated; and turning off said power supply after detection of the pressing of said power supply key and the ON state of said power supply.

3. A power supply unit for radio equipment comprising:

input means having a plurality of keys;

power generator means for generating power;

switching means, connected to said power generator means, for turning off said power to said radio equipment;

disabling means for disabling the turn-off of said switching means in response to operation of a predetermined key of said input means; and an adjustable timer for setting an adjustable time after one of said plurality of keys is pressed;

said switching means turning off said power supply at the end of the adjustable time set by said adjustable timer.

4. A power supply unit for radio equipment comprising:

input means having a plurality of keys;

power generator means for generating power;

switching means, connected to said power generator means, for turning on said power to said radio equipment; and disabling means for disabling the turn-on of said switching means in response to a first operation of a predetermined key of said input means;

said switching means turning on said power supply when said predetermined key is operated again for a second time.

5. A method of supplying power from a power supply unit for radio equipment, comprising the steps of:

detecting a first operation of a predetermined key;

detecting a first pressing of a power supply key;

detecting an OFF state of a power supply;

disabling a turn-on of said power supply in response to the first operation of said predetermined key;

detecting a second operation of said predetermined key;

enabling the turn-on of said power supply in response to the second operation of said predetermined key; and turning on said power supply after detection of a second pressing of said power supply key and the OFF state of said power supply.

* * * * *

UNITED STATES PATENT AND TRADEMARK OFFICE
CERTIFICATE OF CORRECTION

PATENT NO. : 5,819,170
DATED : October 6, 1998
INVENTOR(S) : Noriko Norimatsu

Page 1 of 1

It is certified that error appears in the above-identified patent and that said Letters Patent is hereby corrected as shown below:

Column 1,
Line 53: "An" should read -- As --

Title Page,
Item [56] FOREIGN PATENT DOCUMENTS: Insert

-- Unexamined Japanese Patent Appln. H5-3449

Unexamined Japanese Patent Appln. H5-68082

Unexamined Japanese Patent Appln. H4-239246

Unexamined Japanese Utility Model No. H4-67739 --

Signed and Sealed this

Twenty-fourth Day of July, 2001

Attest:

*Nicholas P. Godici*

NICHOLAS P. GODICI
*Attesting Officer*  *Acting Director of the United States Patent and Trademark Office*